(12) United States Patent
Wilson et al.

(10) Patent No.: US 8,730,309 B2
(45) Date of Patent: May 20, 2014

(54) PROJECTORS AND DEPTH CAMERAS FOR DEVICELESS AUGMENTED REALITY AND INTERACTION

(75) Inventors: Andrew David Wilson, Seattle, WA (US); Hrvoje Benko, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 539 days.

(21) Appl. No.: 12/819,230

(22) Filed: Jun. 21, 2010

(65) Prior Publication Data

US 2011/0205341 A1 Aug. 25, 2011

Related U.S. Application Data

(60) Provisional application No. 61/307,422, filed on Feb. 23, 2010.

(51) Int. Cl.
*H04N 13/04* (2006.01)
(52) U.S. Cl.
USPC ..................................... 348/51; 348/E13.075
(58) Field of Classification Search
USPC ........................................................... 348/51
See application file for complete search history.

(56) References Cited

U.S. PATENT DOCUMENTS

| | | | |
|---|---|---|---|
| 4,402,608 A | 9/1983 | DiMatteo et al. | |
| 6,431,711 B1 * | 8/2002 | Pinhanez | 353/69 |
| 7,348,963 B2 * | 3/2008 | Bell | 345/156 |
| 7,576,727 B2 | 8/2009 | Bell | |
| 8,035,614 B2 * | 10/2011 | Bell et al. | 345/158 |
| 2006/0158452 A1 * | 7/2006 | Borger et al. | 345/582 |
| 2008/0285843 A1 | 11/2008 | Lim | |

FOREIGN PATENT DOCUMENTS

| | | |
|---|---|---|
| KR | 1020020040773 A | 5/2002 |
| KR | 100811015 B1 | 3/2008 |
| KR | 100811015 B1 | 11/2008 |
| WO | WO2009069958 A2 | 6/2009 |

OTHER PUBLICATIONS

"International Search Report", Mailed Date: Oct. 24, 2011, Application No. PCT/US2011/024925, Filed Date: Feb. 15, 2010, 11 Pages.

(Continued)

*Primary Examiner* — Dave Czekaj
*Assistant Examiner* — Nam Pham
(74) *Attorney, Agent, or Firm* — Dan Choi; Carole Boelitz; Micky Minhas (57) ABSTRACT

Architecture that combines multiple depth cameras and multiple projectors to cover a specified space (e.g., a room). The cameras and projectors are calibrated, allowing the development of a multi-dimensional (e.g., 3D) model of the objects in the space, as well as the ability to project graphics in a controlled fashion on the same objects. The architecture incorporates the depth data from all depth cameras, as well as color information, into a unified multi-dimensional model in combination with calibrated projectors. In order to provide visual continuity when transferring objects between different locations in the space, the user's body can provide a canvas on which to project this interaction. As the user moves body parts in the space, without any other object, the body parts can serve as temporary "screens" for "in-transit" data.

20 Claims, 7 Drawing Sheets

(56) References Cited

OTHER PUBLICATIONS

Gargallo, et al., "Bayesian 3D Modeling from Images using Multiple Depth Maps", Retrieved at << http://citeseerx.ist.psu.edu/viewdoc/download?doi=10.1.1.143.8508&rep=rep1&type=pdf >>, CVPR, Proceedings of the 2005 IEEE Computer Society Conference on Computer Vision and Pattern Recognition (CVPR'05), vol. 02, Jun. 20-26, 2005.

Nguyen, et al., "Depth image-based rendering from multiple cameras with 3D propagation algorithm", Retrieved at << http://portal.acm.org/citation.cfm?id=1594116&dl=GUIDE&coll=GUIDE&CFID=85935589&CFTOKEN=23121094 >>, International Conference on Immersive Telecommunications, Proceedings of the 2nd International Conference on Immersive Telecommunications, May 27-29, 2009.

Ohta, et al., "Share-Z: Client/Server Depth Sensing for See-Through Head Mounted Displays", Retrieved at << http://image-www.esys.tsukuba.ac.jp/research/publications/ohta_ISMR_2001Mar.pdf >>, Presence: Teleoperators and Virtual Environments, vol. 11, No. 2, Apr. 2002.

Gingichashvili, Sarah., "PlayAnywhere—Microsoft's Interactive Playground", Retrieved at << http://thefutureofthings.com/news/1037/playanywhere-microsofts-interactive-playground.html >>, Nov. 2, 2007.

Fuchs, et al., "Augmented Reality Visualization for Laparoscopic Surgery", Retrieved at << http://www.cs.odu.edu/~jrcrouch/papers/AR_Laparoscope.pdf >>, Lecture Notes in Computer Science, vol. 1496, Proceedings of the First International Conference on Medical Image Computing and Computer-Assisted Intervention, Oct. 11-13, 1998.

Zhou, et al., "Multi-Projector Display with Continuous Self-Calibration", Retrieved at << http://vis.uky.edu/~wangl/Research/Publication/2008/continuous_display_procams08.pdf >>, International Conference on Computer Graphics and Interactive Techniques, Proceedings of the 5th ACM/IEEE International Workshop on Projector camera systems, Aug. 10, 2008.

Wilson, Andrew D., "Depth-Sensing Video Cameras for 3D Tangible Tabletop Interaction", Retrieved at << http://research.microsoft.com/en-us/um/people/awilson/publications/WilsonTabletop2007/WilsonTabletop2007.html >>, In Proceedings of the 2nd IEEE International Workshop on Horizontal Interactive Human-Computer Systems (Tabletop), 2007.

Office Action for CN Application/Patent No. 201180010523.9, entitled "Projectors and Depth Cameras for Deviceless Augmented Reality and Interaction," dated Jun. 20, 2013, with English translation, 24 pages.

* cited by examiner

PROJECTORS AND DEPTH CAMERAS FOR DEVICELESS AUGMENTED REALITY AND INTERACTION

CROSS-REFERENCE TO RELATED APPLICATIONS

This application claims the benefit of U.S. Provisional Patent application Ser. No. 61/307,422 entitled "PROJECTOR AND DEPTH CAMERA SYSTEMS FOR DEVICELESS AUGMENTED REALITY AND INTERACTION" and filed Feb. 23, 2010, the entirety of which is incorporated by reference herein.

BACKGROUND

Recent touch-sensitive interactive displays are often thought to be appealing since users can touch virtual objects. Together with multi-touch features and fast graphics capability, the "direct touch" aspect of these systems allows a more convincing simulation of the manipulation of physical objects (such as paper documents, photos, etc.) than previously available with conventional input devices.

Recent work has demonstrated the use of sensing and display technologies to enable interactions directly above the interactive surface, but these are confined to the physical extent of the display. Virtual and augmented reality techniques can be used to go beyond the confines of the display by putting the user in a completely virtual 3D environment, or a blend of the real and virtual worlds. Unfortunately, to be truly immersive, such approaches typically require cumbersome head mounted displays and tracking devices.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture combines multiple depth-sensing cameras and multiple projectors to cover a specified space (e.g., a room) for augmented reality and virtual interaction. The cameras and projectors are calibrated, allowing the development of a multi-dimensional (e.g., 3D) model of the objects in the space, as well as the ability to project graphics in a controlled fashion on the same objects. The architecture incorporates the data from all depth cameras into a unified multi-dimensional model in combination with calibrated projectors. Moreover, interesting user interactions are enabled.

In order to provide visual continuity when transferring objects between different locations in the space, the user's body (or other objects in the field of view) can serve as a temporary canvas on which to project this interaction. As the user moves body parts, for example, in the space, without any other object, the body parts can serve as temporary "screens" for "in-transit" data between existing screens/interfaces in the environment.

The architecture facilitates interactions in the physical space that include connecting objects, picking objects, dropping objects, and employing spatial widgets such as virtual menus.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The combination of depth cameras and projectors enable new interactive experiences. The rich experience of a dense 3D mesh (nets of interconnected polygons, such as triangles) updated in realtime invites a shift in thinking about computer vision. Rather than struggling to reduce the mesh to high-level abstract primitives, many interactions can be achieved by less destructive transformations and simulation on the mesh directly. In doing so, the properties that are more basic to the precise physical shape of the users and the user environment can be leveraged.

The architecture uses the capabilities of depth-sensing cameras in combination with projectors to sense and utilize even the smallest corner of the environment as a display. For example, as employed herein, the depth-sensing camera is able to directly sense range (distance) to the nearest physical surface at each pixel location, in addition to color. In an alternative implementation, 3D time-of-flight cameras can be employed.

For example, the user may use touch to manipulate a virtual object projected on an un-instrumented table, grab the object from the table by moving the object with one hand off the table and into the other hand, see the object sitting in a hand as the user walks over to an interactive wall display, and then place the object on the wall by touching the wall.

The architecture enables a surface everywhere in the environment, the space is the computer, and even the user body can be a display surface. In other words, all physical surfaces can be interactive displays. Not only are the interactive displays active, but the space between the displays is active as well, enabling users to relate to the displays in interesting ways, such as connecting one to another by touching both displays. Graphics can be projected onto the user's body to enable interactions in mid-air such as holding a virtual object as if the object were real, or making a selection by a menu projected on a hand.

Multiple calibrated depth cameras and projectors are combined to enable the projection of graphics onto objects (e.g., moving, still) without user instrumentation. Cameras and projectors are calibrated to a single coordinate system in real world units, allowing authoring of interactive experiences without regard to which camera or display is ultimately used for a particular interaction.

The selective projection of sensed 3D data to 2D images allows the use of familiar 2D image processing techniques to reason about 3D space. Such projections can be used, for example, to emulate surface-like functionality on an un-instrumented table. Multiple projections can be related to one another such that objects in two or more projections may be cross-referenced to establish connectivity in real space. This can be used to detect when a user is touching two simulated surfaces (as when moving an object from one to the other) without relying on complex and error-prone tracking techniques.

Additionally, the user may "hold" a virtual object by simulating the physics of the object resting on some part of the body, represented by the 3D mesh sensed by the depth cameras. Furthermore, the user may change a menu selection projected on one hand by moving the hand according to a predetermined motion (e.g., up and down) in space.

The architecture enables interactivity and visualizations throughout an everyday environment without augmenting the users or the room with sensors or markers. The interactions include simulated interactive surface, through-body transitions between surfaces, grasping objects, and spatial menus.

With respect to simulated interactive surfaces, room surfaces are enabled to become an interactive "display" where users can use hand gestures and touch to manipulate projected content. In one implementation, an interactive wall and an interactive table can be provided; however, it is to be understood an arbitrary number of similar surfaces can be generated and employed. Neither the wall nor the table are discrete displays, but instead are standard pieces of furniture projected and sensed from projectors and cameras above.

Depth-sensing video camera technologies provide precise per-pixel range data in addition to color video. Such cameras find application in robotics and vision-based human-computer interaction scenarios such as games and gesture input systems.

A depth-sensing camera can be employed to facilitate an interactive tabletop system, where the camera builds a height map of the objects on the table surface. This height map is used in a simulation game (e.g., driving) that allows players to drive a virtual car over real objects placed on the table, for example. Players can use folded bits of paper, for example, to lay out a course of ramps and other obstacles. A first projector displays the position of the car on the surface, such that when the car is driven over a ramp, for example, the car is airborne according to a transform. A second projector can show a synthetic graphical view of the entire surface, or a traditional arcade view from behind the car.

The disclosed architecture employs multiple depth-sensing cameras and projectors to provide a 3D rendering and interactive experience in a volume of space (e.g., a room). The cameras provide output that includes range (depth) and color for each pixel. With respect to a surface, this facilitates the ability to tailor the projector graphics onto the surface as well as on an object (moving or stationary) relative to the surface. A multidimensional model is created that combines camera outputs and projector calibrations into a unified description over the space. The cameras are positioned and oriented in such as way as to capture and provide a full 3D rendering of object shapes in realtime in the space when stationary and moving through the space. A strength of having a unified model is the ability to decouple the authoring and interaction design from the actual equipment utilized to collect data.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
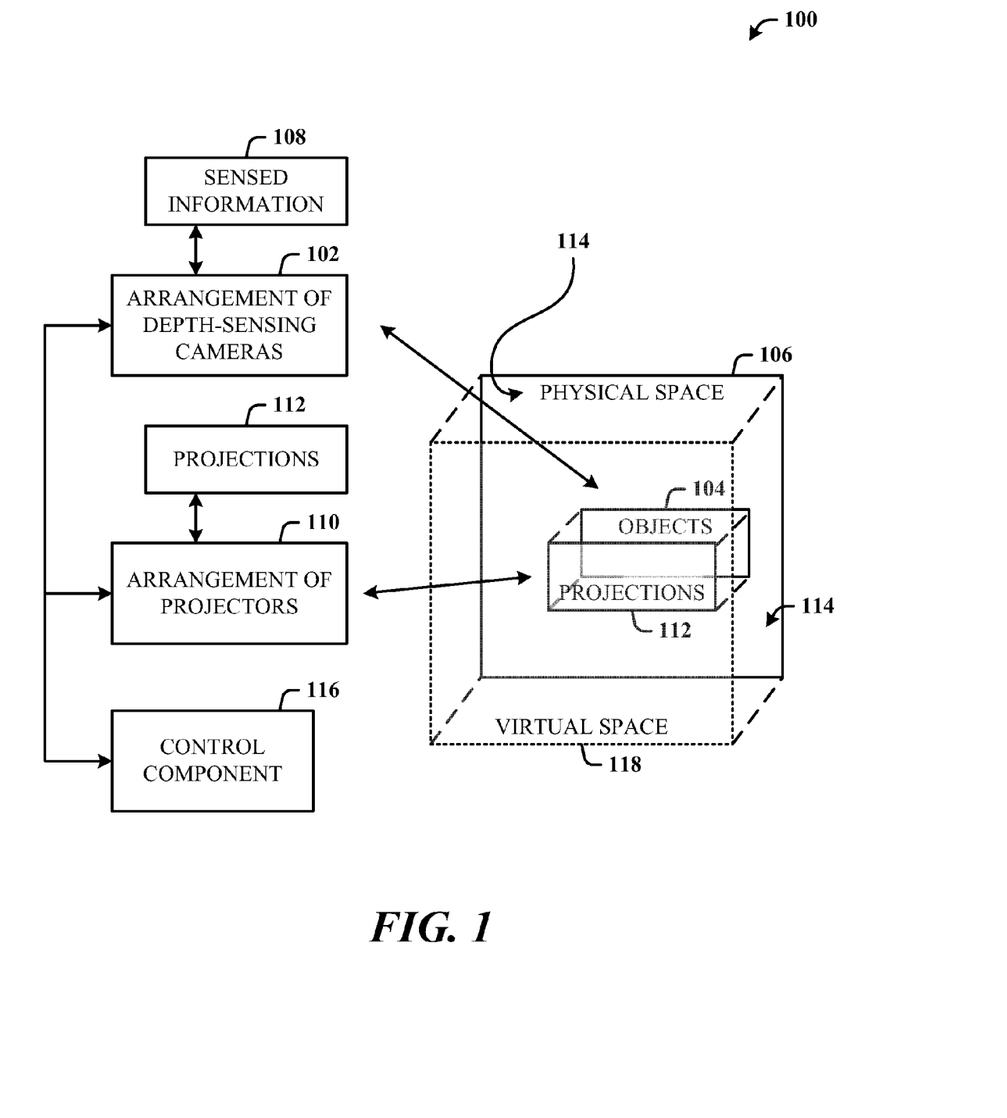
FIG. 1 illustrates a multi-dimensional modeling system in accordance with the disclosed architecture.

FIG. 1 illustrates a multi-dimensional modeling system 100 in accordance with the disclosed architecture. The system 100 includes an arrangement of depth-sensing cameras 102 that sense objects 104 (e.g., distance from the camera and color) in a physical space 106 and output sensed information 108, an arrangement of projectors 110 that impose projections 112 on surfaces 114 (e.g., the objects 104, walls of the physical space 106, a user in the space 106, etc.) in the physical space 106, and a control component 116 that processes the sensed information 108 and the projections 112 to map a virtual interactive space 118 (e.g., continuous) to the physical space 106 to emulate an interactive display for interaction (e.g., user) with the objects 104 and the surfaces 114. Note that although depicted as a rectangular 2D space, the physical space 106 is a 3D space that can include a single inside surface or multiple inside surfaces, where surfaces can be the inside walls (and floor, ceiling) of the space 106, objects such as boards suspended on the walls, on the objects 104, on body parts or the entire body of a user, and so on. The virtual space 118 is illustrated as being offset from the physical space 106 for clarity, where in reality, as viewed through a display, the interface between the virtual space 118 and physical space 106 may be indiscernible.

The system 100 can further comprise a mapping component that maps portions of the sensed information to the projections to create a monolithic 3D physical coordinate system. The control component 116 applies the sensed information 108, which is 3D sensed information, to the projections 112, which are 2D images. The cameras 102 and the projectors 110 are registered to the physical space 106. The projections 112 are interrelated such that objects in at least two projections 112 are cross-referenced to establish connectivity in the physical space 106.

The control component 116 facilitates projection of a spatial widget on a surface in the physical space 106, and interactive manipulation of the spatial widget is accomplished using a predetermined movement (e.g., hand gestures) in the physical space 106. The sensed information 108 of the depth-sensing cameras 102 is utilized to construct a 3D mesh that the control component 116 processes to simulate positioning of a virtual object relative to a user in the physical space 106. The 3D mesh is constructed in realtime and models a sensed portion of the physical space 106. The control component 116 processes the sensed information 108 to infer depth of the objects 104 in the physical space 106.

Figure 2:
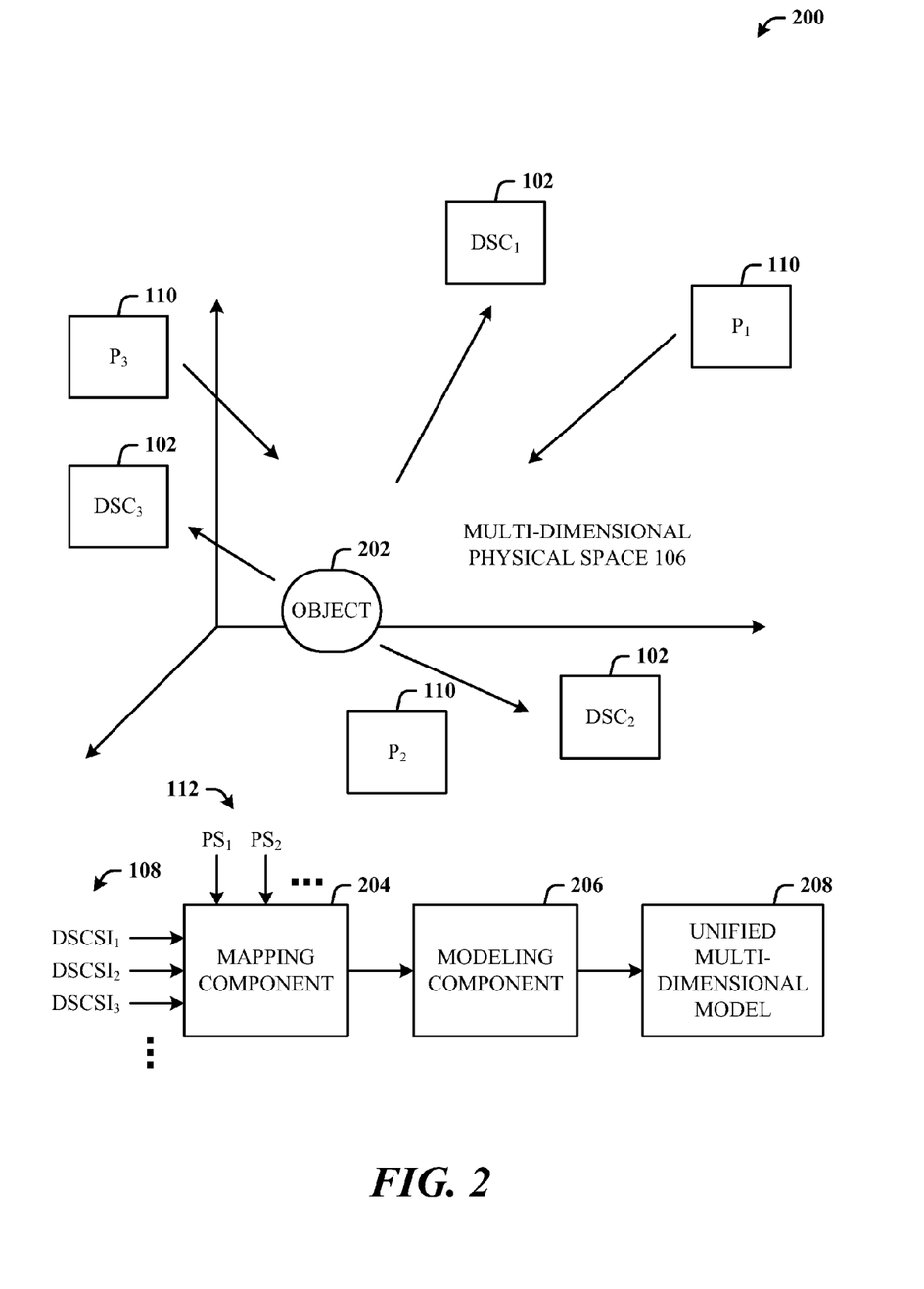
FIG. 2 illustrates an alternative embodiment of a multi-dimensional modeling system in accordance with the disclosed architecture.

FIG. 2 illustrates an alternative embodiment of a multi-dimensional modeling system 200 in accordance with the disclosed architecture. The system 200 includes the arrangement of depth-sensing cameras (DSCs) 102 that sense objects (e.g., an object 202) in the space 106 and output the sensed information 108 (DSCSI) (e.g., $DSCSI_1$, $DSCSI_2$, . . . ). The system 200 also includes the arrangement of projectors (P) 110 (denoted $P_1$, $P_2$, . . . ) that impose the projections 112 (denoted $PS_1$, $PS_2$, . . . ) relative to the space 106.

A mapping component 204 maps portions of the sensed information 108 to the projections 112 to create mapping information. A modeling component 206 creates a multi-dimensional model 208 based on the sensed information 108 and the mapping information. The model 208 is employed for interaction with the object 202 in the space 106.

In a 3D environment, multiple depth-sensing cameras provide detailed information regarding the 3D shape of objects in the space (e.g., room), including furniture and people within the space, for example. The information in the images returned by depth cameras can be used to calculate the precise real-world coordinates (e.g., in millimeters) of the observed surfaces in the space. This invites the use of a 3D geometric model. The data (e.g., sensed information) from the multiple cameras can be integrated into the unified model 208 correctly based on the relative orientation and position of the cameras (with respect to each other, or with respect to some chosen physical world coordinate system). This orientation and position information can be computed by a standard calibration procedure.

Multiple projectors may be similarly incorporated into the 3D model by another standard calibration procedure, resulting in a model which is useful for presenting graphics on any surface in a controlled fashion, provided the surface is visible by at least one camera and at least one projector. For example, it is possible to project a graphic onto a surface such that it appears with a certain size regardless of surface's distance to the projector. In general, if the graphical objects can be placed in the 3D model using standard graphics techniques, it may be rendered correctly in the real physical world, with certain limitations such as line-of-sight of both cameras and projectors.

This basic model can be used to enable useful interactions, which include the following. A virtual object can be projected onto a desk in the space. When a user approaches the desk and brushes the object (e.g., with one hand) into the other hand, the object appears in the hand as the user walks near to a wall display. If the user throws the virtual object onto the wall display with a throwing motion, the object carries to the wall display and appears on the wall display. The transfer of a virtual object from one display to another is thus completed.

Consider a virtual "data source" rendered on some surface in a room, and a "data sink" nearby. The user can connect the source to the sink by touching the source with one hand, and touching the sink with the other hand. The connection can be illustrated by projected graphics onto the user's body, and the data itself can be rendered onto the user directly. Note that data sources and data sinks can be as fundamental as an icon projected onto a static surface, or each of the source or the sink can be a person. Consider that data can be transferred by shaking hands with another person, and viewing this connection graphically, projected on the hands as the interaction occurs.

Accordingly, based on the disclosed architecture, different kinds of new in-air UI controls can be implemented. Further consider, for example, that a spot on surface (e.g., floor) indicates the presence of a menu selection. The user can position a hand over the spot, and the system responds by projecting the current selection directly onto the user's hand. The user can change the selection by raising or lowering the hand, or by performing some other gesture.

Figure 6:
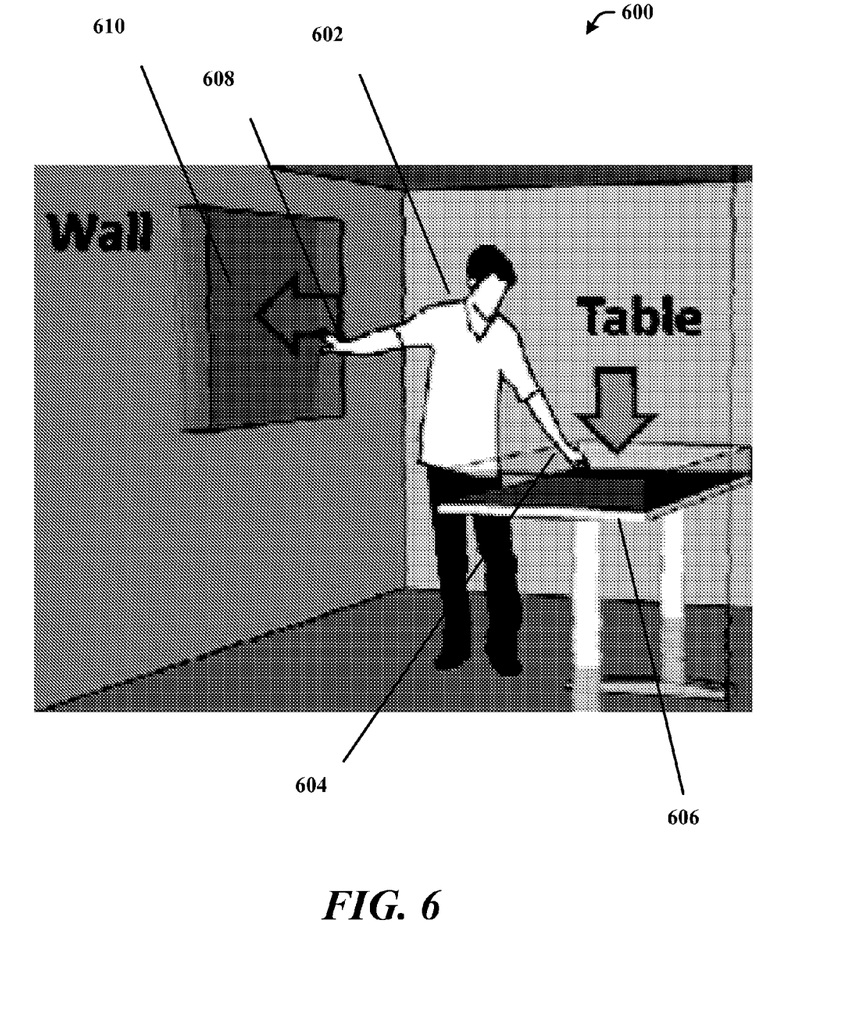
FIG. 6 illustrates a user interacting with an example system in accordance with the disclosed architecture.

The capability of the disclosed architecture to track and reason about the interactions throughout the space (e.g., room) facilitates the connection of individual interactive surfaces into a seamless monolithic interactive space. For example, as shown in FIG. 6, a user 602 can transition objects between interactive surfaces "through-body" by simply touching the object and then touching the desired location. The system infers that both contacts belong to the same person, establishing a connection between surfaces. For example, when the user 602 touches (e.g., via a left hand 604) an image on a table 606 and then also touches (e.g., via a right hand 608) a wall 610, the image is transitioned to the wall 610. In other words, through-body transitions are accomplished by simultaneously touching two surfaces.

While both surfaces may be touched at the same time in order to trigger the transition, the object touched first is the source, while the surface touched second becomes the destination. To show the connection that is made "through" the user's body, a visual confirmation can be made in the form of a brief highlight (e.g., two seconds) projected onto the user, serving as a notification to others that an object was transferred and denoting who performed the transfer.

In an alternative implementation, rather than making simultaneous touch as the means for target destination transfer of an object, course and speed can be employed in the 3D mesh to infer a destination relative to the source. In yet another implementation, sequential contact can be determinative for surface connection in that if the source was first touched by a user hand, and then the destination surface is touched by the user hand within two seconds of touching the source, the connection can also be considered as made.

Figure 7:
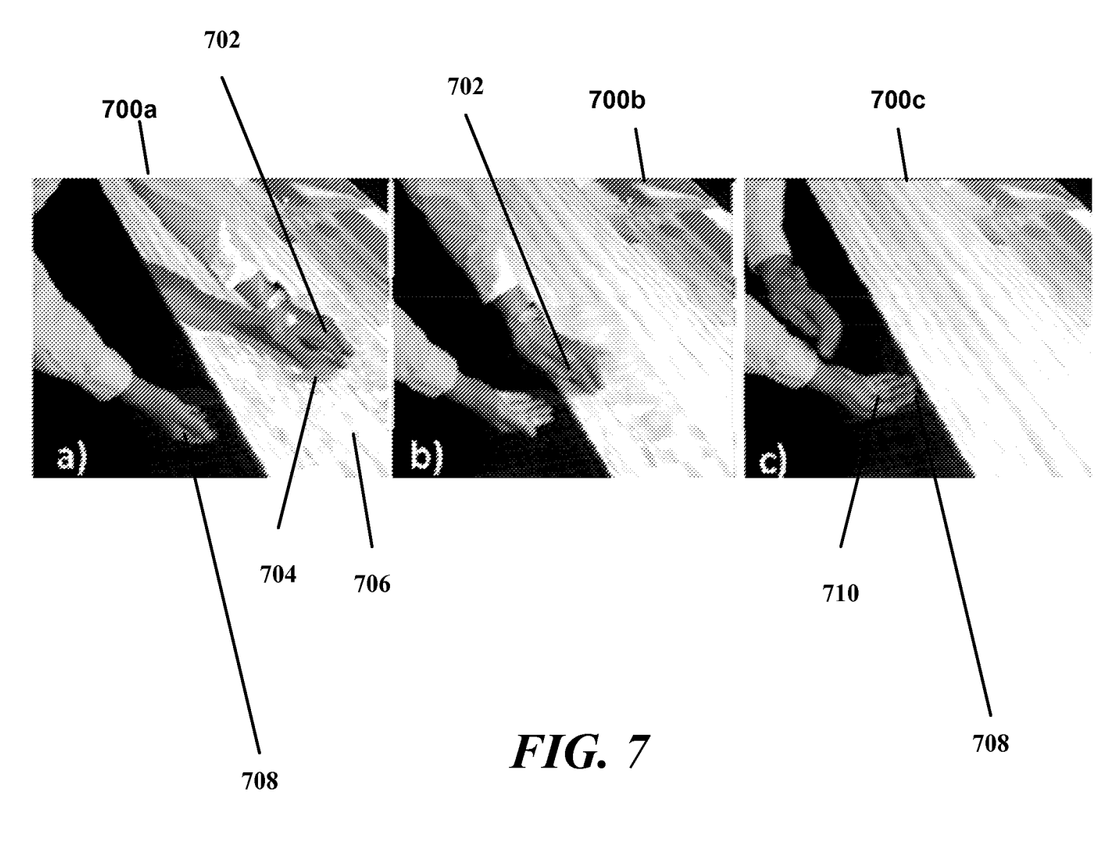
FIG. 7 illustrates a user interacting with an example system in accordance with the disclosed architecture.

In addition to making connections through-body, the user can literally drag an object off an interactive surface and pick it up by hand. The system does not actually track the user's hands (or any other body part), but rather gives each object a physics-like behavior. Picking up objects from a table, for example, can be accomplished by swiping the object into a hand. For example, as shown in FIG. 7, in views 700a, 700b, and 700c, a user's left hand 702 may swipe an object 704 on an interactive surface 706, into the user's left hand 708. Following the pick-up of the object 704, an iconic representation 710 of the object 704 can be presented in association with the hand (e.g., the left hand 708).

The user can actually take the object in hand, pass the object to others in the environment, and carry the object between interactive surfaces. When holding a virtual object in hand, touching any interactive surface results in instant through-body transition, giving the user an easy and consistent way to placing an object back down on the surface.

In mid-air, the available projection area is limited to the size of the user's hand, making it difficult to project a large virtual object. To address the projection of a large virtual object on a user hand in mid-air, each virtual object can be represented with a small colored ball while held in-hand.

The ability to precisely detect the user's position in space can be used to enable various spatial interfaces. A spatial vertical menu can be activated, by placing a hand in a vertical space above a projected menu marker on the floor, for example. Other triggers can be employed. Moving the hand in an up-and-down motion can be made to reveal different options which are directly projected onto the user's hand. Dwelling on a menu option (e.g., for two seconds) can a trigger to make a selection. As indicated, the user's body parts can be used as the canvas for projection in mid-air, when no other surface is available.

In one implementation, the depth-sensing cameras can report per-pixel depth estimates with an estimated depth resolution of centimeters distance from the sensor. The depth can be computed using a structured light approach. The camera can employ a combination of an infra-red (IR) camera, RGB (red-green-blue) camera and an IR light source positioned approximately centimeters from the IR camera. This light source projects a pattern on the environment. The camera captures this pattern overlaid on the scene and computes the depth from the distortion of the pattern in the image. The resulting "depth image" then contains a depth estimate in millimeters for each pixel in the image.

Knowing the 3D position of each part of the image facilitates the ability to segment entities in space. A baseline 3D mesh (a mesh of the space without users) can be collected and used to resolve any new object in the scene (i.e., pixels with a depth value that is different than a baseline mesh).

In one implementation, the architecture employs three different depth-sensing cameras and three projectors, each with independent location and field of view. The cameras and projectors are registered into a single 3D coordinate system. Since the depth cameras report depth values corresponding to the real world and projectors are calibrated using the camera values, both the cameras and the projectors are registered with the real world (e.g., the physical space 106).

A first step of calibration is to calibrate the depth cameras. To register the camera with the physical space three points in the camera image (points can be in-plane) can be utilized. A fixed grid of retro-reflective dots (with known real-world positions) can be positioned in the space such that at least three of these points can be seen by each camera. The retro-reflective dots allow easy identification of the calibration points in the camera's infra-red image, since these points appear much brighter than the surrounding environment. In order to compute the 3D location of each calibration point, a sample and average of the depth values of the surrounding pixels is performed and used as the depth estimate. This area averaging solution also reduces camera noise when reading depth at any single point.

When three real-world points are sampled and identified by the camera, 3D camera pose estimation is performed and repeated for each camera, after which all cameras are calibrated into the same coordinate system.

A second step of the calibration routine can be to register the projectors given the previously calibrated cameras. For this step, four calibration points can be utilized with at least one point out of plane. These four points are correctly identified both by the depth cameras and located in the projector image, after which an algorithm can be used to find the position and orientation of the projector. This process utilizes the focal length and center of projection of the projector. Again, retro-reflective dots can be placed anywhere in the scene since dot position can be correctly estimated by the depth camera.

With respect to the calibration of simulated interactive surfaces, the interactive surfaces can be designated manually. When using separate rectangular surfaces, each can be separately calibrated by specifying the top-left, top-right, and bottom-left corner of the surface in the depth camera image. In an alternative implementation, all surfaces are made interactive. Simultaneous to the designation of the new projected interactive surface, the three calibration points specify the extent of the interactive space above the surface to track all user actions in the volume above the surface.

Based on the calibrations, a 3D mesh can be captured in realtime that models the entire sensed portion of the space. Virtual objects may be placed on top of the mesh in the same scene. Due to projector calibration, these objects are then correctly projected in the real space on top of real objects.

The architecture employs one or more algorithms to detect when the user is in the space, when the user touches an interactive surface, when the user inserts a hand into an active region of space corresponding to a menu, and so on. The meshes from the two detected users, for example, are tracked separately and visually differentiated (e.g., colored with a different hue).

Following is a technique that uses 2D image processing to implement interactions. Computing a projection of the 3D data to create a new image can be considered as having been generated by a "virtual camera" (there is no corresponding real camera). Such a new image can be computed by first transforming each point in every depth-sensing camera image from local camera coordinates to world coordinates, and then to virtual camera coordinates by the virtual camera view and projection matrices. The z value of this point is written to its (x,y) position in a destination image. The data from all three depth cameras may be "rendered" in this manner to a single virtual camera view.

When using a virtual camera, the view and projection matrices of the virtual camera image can be chosen independently from the configuration of the real depth cameras. Since each virtual camera can incorporate depth data from multiple depth cameras, the consumer of a virtual camera view need not concern itself with the particular position and orientation of the depth cameras, or even the fact that there are multiple cameras.

Multiple virtual camera views may be computed, each precisely tailored to support a specific interaction. Virtual cameras can use near and far clipping planes to select a particular volume of the space. For example, three orthographic projections can be used: one projection giving a "plan" view of the room, and two projections configured to capture interactions just above the tabletop and wall display surfaces.

Once computed, the virtual camera images can be processed using 2D image processing techniques. The virtual camera image just above a tabletop, for example, appears similar in nature to the images generated by imaging interactive displays. The disclosed architecture emulates interactive surface behavior by duplicating the processing pipeline typical of these systems: contacts are discovered by computing connected components, and are tracked over time. Hit testing and multi-touch manipulation of virtual objects (e.g., translation, rotation, scaling) are naturally supported.

After discovering contacts in both the table and wall virtual camera views, the plan view is useful in determining whether a contact on the tabletop and a contact on the wall display are physically connected, as when the user is simultaneously touching both displays. Connectivity can be computed by constructing tables that index connecting components from one view to another, and exploiting the fact that all views are related by the input depth images and world coordinate system.

A map is computed for each depth camera image which indicates, at each depth image pixel location, the corresponding object (a connected component) in the plan view (if any). Using the map, a second pass is performed to collect, for each object observed in the tabletop view, the set of plan view components that correspond to all pixels belonging to the table object. A set of corresponding plan view objects are stored with each table object. This process is repeated for the wall view. A table and wall contact are then physically connected by objects in the plan view (e.g., the user's body) if the intersection of the objects stored with the tabletop and wall objects is non-empty, that is, the objects are connected by the plan view objects in the intersection.

A virtual object appearing on an emulated interactive surface may be picked (also "picked up") by the user, for example, when the object is brought close to the edge of the interactive surface, and there is a surface (such as the user's hand) that appears nearby. Once picked, the movement of the object is determined by maximizing an objective function over a window of possible new locations in the plan view. In one implementation, the objective function is a linear combination of multiple factors which minimize the amount of motion of the object, disallow points that do not correspond to an observed surface, favor movement to a lower position, and favor movement to a location where the observed surface is flat (i.e., variance of surface height over a region is small).

The objective function can be chosen experimentally to loosely emulate the motion of a ball moving on a surface, while ensuring that it does not fall off the edge of the surface. In more complex implementations, physics engines can be employed to control the interaction of virtual objects with meshes directly.

"Dropping" an object onto an interactive surface can be achieved in the reverse order of picking up by holding the object near the interactive surface. The object may also be dropped by determining that the object (connected component) holding the virtual object in the plan view is connected to an object in either the tabletop or wall view, for example. In this case the virtual object is dropped onto the interactive surface. This can be achieved by holding the virtual object in one hand while touching the destination display, or by moving the held object close to the destination display.

Spatial menu is another interaction based on a virtual camera (e.g., a camera describing a long and narrow column of space above a particular location). Interaction can include the user placing a hand relative to a 3D location of the particular menu item. The spatial menu can be marked to indicate where the menu is located such as a floor-fixed projected marker, for example. The marker serves as a spatial reference that reduces the complexity of the 3D selection task to a one dimensional sweep through a column of space above the reference.

Additionally, the system can also reason about the position of the head of the user operating the menu, which can be detected as the highest point on the body. Menu items can be oriented with respect to the detected head position to make the menu items correctly readable to the current user. Essentially, the spatial menu is a user-aware, on-demand spatial widget. Other spatial widgets can be implemented such as for controlling different aspects of the environment (e.g., spatial buttons, sliders, etc.) as well as contextualizing aspect behavior with every object having an associated spatial menu.

Another scenario facilitated by the architecture involves connections among multiple users. For example, if a user touches an object on a table while another user touches the wall, then when the users shake hands, their physical connection forms a computed virtual link which enables transfer of the object from the table to the wall.

In alternative implementations, the surfaces can be allowed to move or change shape, which further allows for dynamic reconfiguration of the displays in the space to suit the needs of the immediate task, such as by moving two desks together as needed, changing a wall display into a desk, or in giving a handheld piece of paper interactive capabilities.

A further extension is that all sensed surfaces can act as one continuous interactive display, over which virtual objects may be moved and manipulated. The continuous interactive surface can include the user's body. For example, a user's hand can turn red when placing the hand into a puddle of (projected) red paint. Touch the blue paint and the hand turns a more of a purple color. Another example, utilizes a menu that unrolls itself along the user's arm when the user touches a button in the room, making a selection with the other hand. Two people can exchange contact information by merely shaking hands, and this transfer is illustrated by graphics animating over the users' bodies. Another example presents translation of a language directly on a user's shirt for others to read when the user speaks in a native language.

More complex implementations that utilize physics engines allow more realistic simulated motion, such as throwing an object towards the wall display, and have the object appear when the object "strikes" the wall. If an object is moved close to the edge of the table, the object can be made to teeter before falling to the floor.

Put another way, a multi-dimensional modeling system is provided that comprises an arrangement of depth-sensing cameras that sense a distance value per pixel of objects in a physical space and output 3D sensed information, an arrangement of projectors that impose 2D projections on surfaces in the physical space, and a control component that processes the 3D sensed information and the projections into virtual camera images as created from perspective view of virtual cameras, the virtual camera images employed to emulate an interactive display for user interactions with the objects and surfaces in the physical space. Two surfaces in the physical space are related virtually based on physical user interaction with the two surfaces.

The control component facilitates virtual picking of an object and virtual dropping of the object based on computed proximity of virtual interactive surfaces to the object. The control component processes the sensed information to infer distance of the objects in the physical space relative to views of the virtual cameras and facilitates presentation of a spatial widget on an interactive surface in the physical space and interactive manipulation of the spatial widget using a predetermined physical movement.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
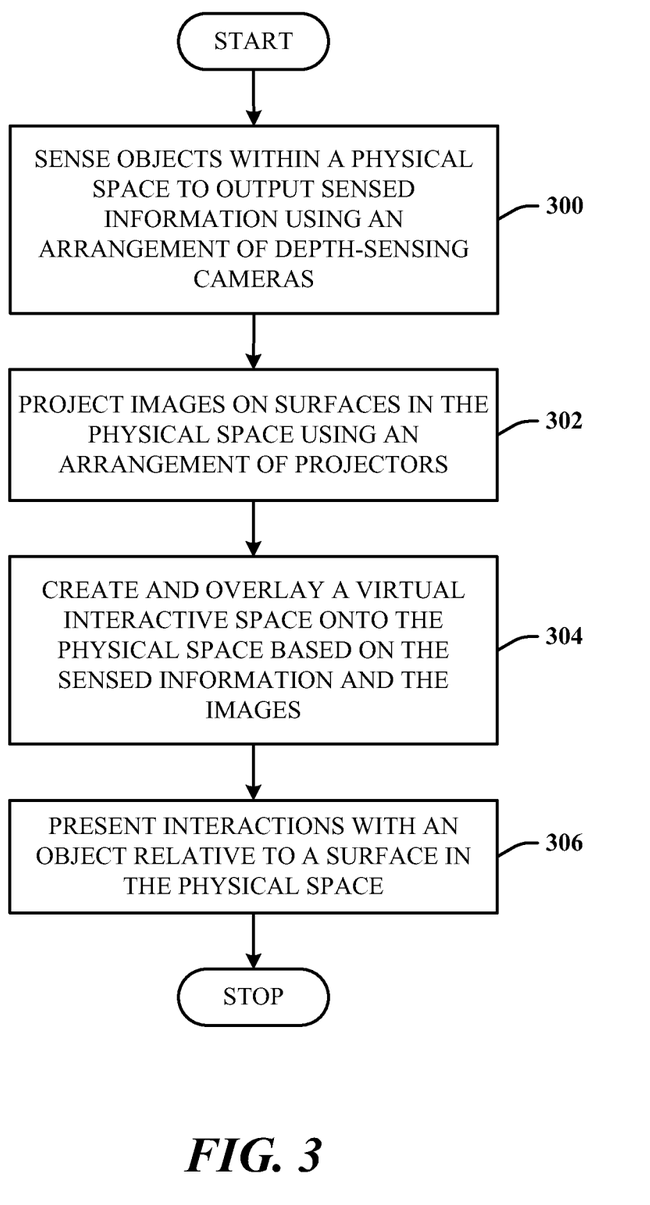
FIG. 3 illustrates a multi-dimensional modeling method in accordance with the disclosed architecture.

FIG. 3 illustrates a multi-dimensional modeling method in accordance with the disclosed architecture. At 300, objects within a physical space are sensed to output sensed information using an arrangement of depth-sensing cameras. At 302, images are projected on surfaces in the physical space using an arrangement of projectors. At 304, a virtual interactive space is created and overlayed onto the physical space based on the sensed information and the images. At 306, virtual interactions with an object are presented relative to a surface in the physical space.

Figure 4:
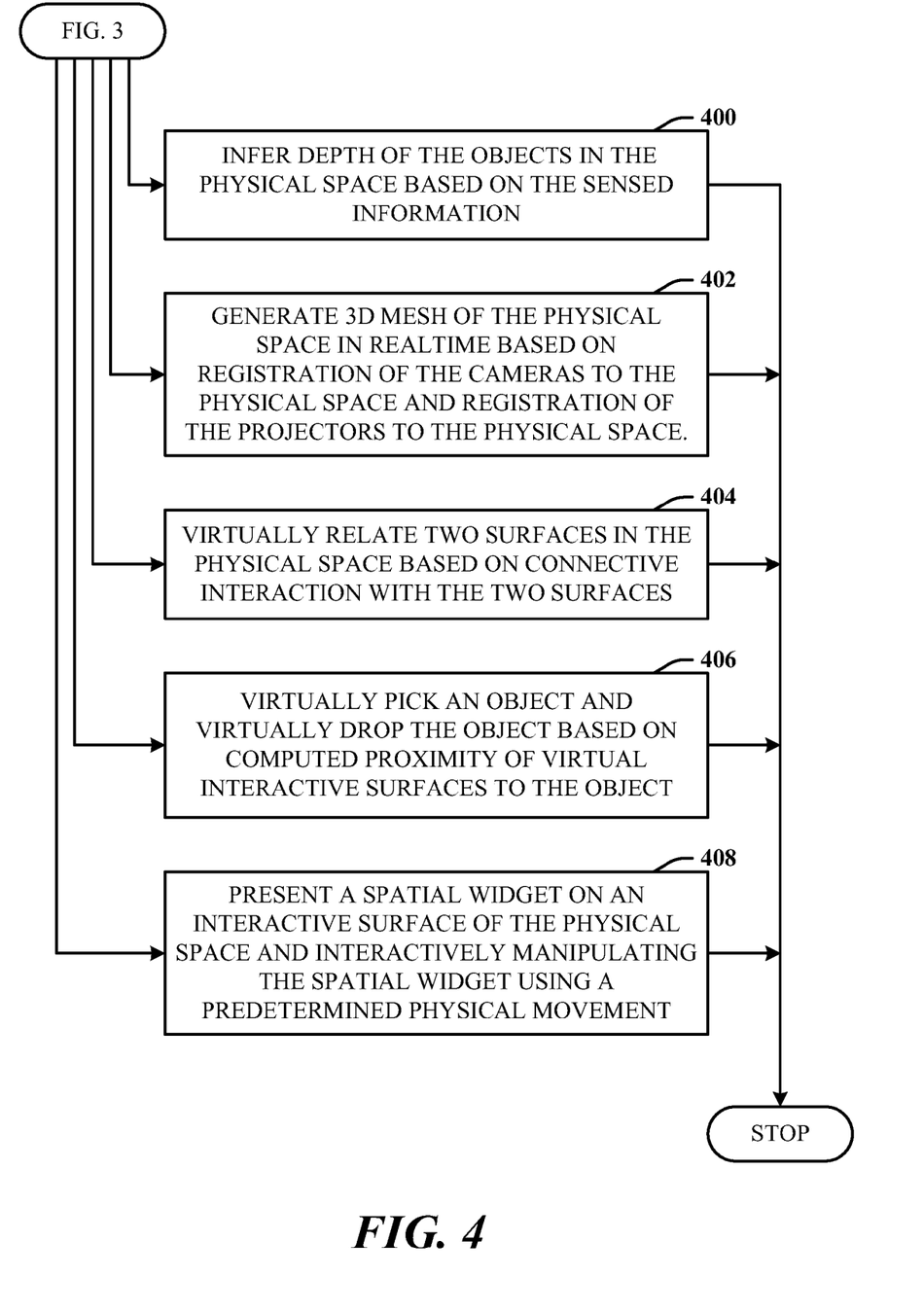
FIG. 4 illustrates further aspects of the method of FIG. 3.

FIG. 4 illustrates further aspects of the method of FIG. 3. Note that the arrowing indicates that each block represents a step that can be included, separately or in combination with other blocks, as additional aspects of the method represented by the flow chart of FIG. 3. It is to be understood that multiple blocks can be considered as additional steps to the flow chart of FIG. 3. At 400, depth of the objects in the physical space is inferred based on the sensed information. At 402, a 3D mesh of the physical space is generated in realtime based on registration of the cameras to the physical space and registration of the projectors to the physical space. At 404, two surfaces in the physical space are virtually related based on connective interaction with the two surfaces. At 406, an object is virtually picked and the object is virtually dropped based on computed proximity of virtual interactive surfaces to the object. At 408, a spatial widget is presented on an interactive surface of the physical space and the spatial widget is interactively manipulated using a predetermined physical movement.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
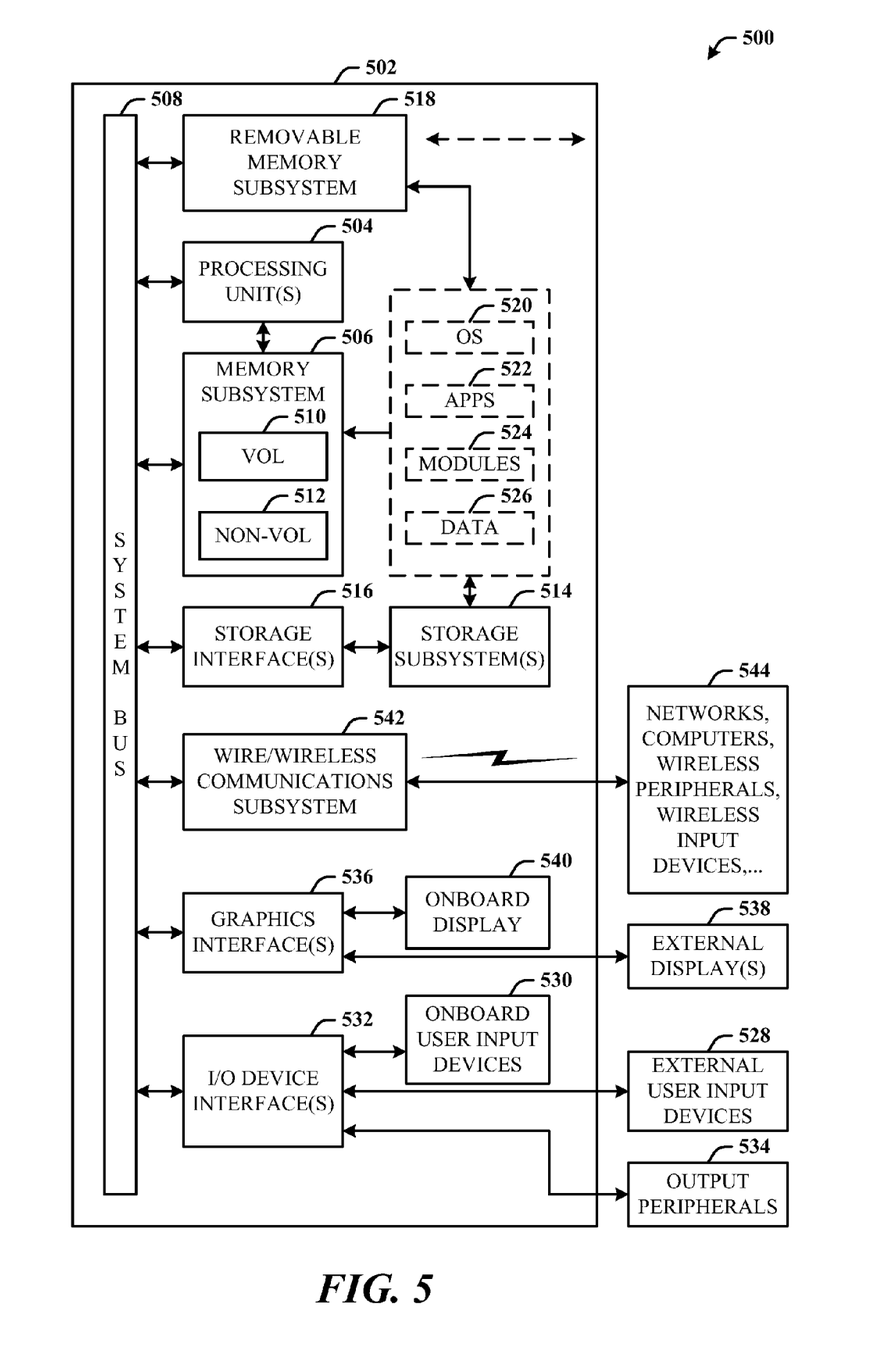
FIG. 5 illustrates a block diagram of a computing system that executes augmented reality and interaction in accordance with the disclosed architecture.

Referring now to FIG. 5, there is illustrated a block diagram of a computing system 500 that executes augmented reality and interaction in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage (physical storage media) such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 (physical storage media) can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

The one or more application programs 522, other program modules 524, and program data 526 can include the entities and components of the system 100 of FIG. 1, the entities and components of the system 200 of FIG. 2, and the methods represented by the flow charts of FIGS. 4-5, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A multi-dimensional modeling system, comprising:
   an arrangement of depth-sensing cameras that sense objects in a physical space and output sensed information;
   an arrangement of projectors that impose projections on surfaces in the physical space; and
   a control component that processes the sensed information and the projections to map a virtual interactive space to the physical space to emulate an interactive display for interaction with the objects and the surfaces,
   the projections interrelated such that objects in at least two projections are cross-referenced to establish connectivity in the physical space,
   at least a portion of the connectivity computed by constructing tables that index connecting components from one view to another view.

2. The system of claim 1, further comprising a mapping component that maps portions of the sensed information to the projections to create a 3D physical coordinate system.

3. The system of claim 1, wherein the control component applies the sensed information, which is 3D sensed information, to the projections, which are 2D images.

4. The system of claim 1, wherein the cameras and the projectors are registered to the physical space.

5. The system of claim 1, wherein the control component facilitates projection of a spatial widget on a surface in the physical space, and interactive manipulation of the spatial widget is accomplished using a predetermined movement in the physical space.

6. The system of claim 1, wherein the sensed information of the depth-sensing cameras is utilized to construct a 3D mesh that the control component processes to simulate positioning of a virtual object relative to a user in the physical space.

7. The system of claim 6, wherein the 3D mesh is constructed in realtime and models a sensed portion of the physical space.

8. The system of claim 1, wherein the control component processes the sensed information to infer depth of the objects in the physical space.

9. The system of claim 1, wherein two surfaces in the physical space are related virtually based on physical user interaction with the two surfaces.

10. A multi-dimensional modeling system, comprising:
    an arrangement of depth-sensing cameras that sense a distance value per pixel of objects in a physical space and output 3D sensed information, and an arrangement of projectors that impose 2D projections on surfaces in the physical space; and
    a control component that processes the 3D sensed information and the projections into virtual camera images as created from perspective views of virtual cameras, the virtual camera images employed to emulate an interactive display for user interaction with the objects and surfaces in the physical space,
    the projections interrelated such that objects in at least two projections are cross-referenced to establish connectivity in the physical space,
    at least a portion of the connectivity computed by constructing tables that index connecting components from one view to another view.

11. The system of claim 10, wherein two surfaces in the physical space are related virtually based on physical user interaction with the two surfaces.

12. The system of claim 10, wherein the control component facilitates virtual picking of an object and virtual dropping of the object based on computed proximity of virtual interactive surfaces to the object.

13. The system of claim 10, wherein the control component processes the sensed information to infer distance of the objects in the physical space relative to views of the virtual cameras.

14. The system of claim 10, wherein the control component facilitates presentation of a spatial widget on an interactive surface in the physical space and interactive manipulation of the spatial widget using a predetermined physical movement.

15. A multi-dimensional modeling method, comprising:
sensing objects within a physical space to output sensed information using an arrangement of depth-sensing cameras;
projecting images on surfaces in the physical space using an arrangement of projectors;
creating and overlaying a virtual interactive space onto the physical space based on the sensed information and the images; and
presenting interactions with an object relative to a surface in the physical space,
the projections interrelated such that objects in at least two projections are cross-referenced to establish connectivity in the physical space,
at least a portion of the connectivity computed by constructing tables that index connecting components from one view to another view.

16. The method of claim 15, further comprising inferring depth of the objects in the physical space based on the sensed information.

17. The method of claim 15, further comprising generating a 3D mesh of the physical space in realtime based on registration of the cameras to the physical space and registration of the projectors to the physical space.

18. The method of claim 15, further comprising virtually relating two surfaces in the physical space based on connective interaction with the two surfaces.

19. The method of claim 15, further comprising virtually picking an object and virtually dropping the object based on computed proximity of virtual interactive surfaces to the object.

20. The method of claim 15, further comprising presenting a spatial widget on an interactive surface of the physical space and interactively manipulating the spatial widget using a predetermined physical movement.

* * * * *